UNITED STATES PATENT OFFICE.

HENRY JÜNEMANN, OF BOSTON, MASSACHUSETTS.

IMPROVEMENT IN COMPOUNDS FOR CLARIFYING MALT LIQUORS.

Specification forming part of Letters Patent No. 197,640, dated November 27, 1877; application filed June 12, 1877.

*To all whom it may concern:*

Be it known that I, HENRY JÜNEMANN, of Boston, county of Suffolk, and State of Massachusetts, have invented a certain new and useful Improved Fining Compound for Malt Liquors, &c., of which the following is a specification:

This invention relates to a compound and its preparation for fining or clarifying lager or other beer, ale, &c.; and consists substantially as hereinafter fully described.

Put in a proper vessel six (6) gallons of water at a temperature of ten degrees (10°) Reaumur, (54½° Fahrenheit;) then add two and one-half (2½) pounds isinglass, one (1) pound of argol, and let the solution or compound stand for twelve (12) hours. Then add six (6) gallons of water at a temperature of fourteen degrees (14°) Reaumur, (63½° Fahrenheit,) one-half (½) pint of vinegar, and about one-quarter (¼) pound of salt. When well mixed, add six (6) gallons more of water at a temperature of ten degrees (10°) Reaumur, (54½° Fahrenheit,) which further dilutes the compound, and reduces the temperature somewhat. Thoroughly stir and mix the solution, when it will be ready for use, and is used as follows:

To a quantity of lager or other beer, ale, &c., to be fined, equal to about forty-five (45) barrels, add two and one-half (2½) gallons of the above fining compound, and let the whole stand for about twelve (12) hours, when the beer or ale, &c., will be thoroughly fined or clarified, and ready to be put into barrels or bottles for use.

The water softens and dissolves the isinglass, the solution of which is accelerated by the argol, and somewhat by the vinegar, as they cut the isinglass, so that the solution is much finer and clearer, and in better condition, and far superior to the process now or heretofore used. The salt preserves the solution.

By the use of this fining compound the beer or ale, &c., is fined or clarified in a much less time than heretofore, and is also more thoroughly fined, and at a reduced expense, as a smaller quantity of isinglass is needed to properly fine the beer, &c.

It is not intended to limit this invention to the particular quantities stated of the ingredients composing the compound, or to the exact number of degrees of temperature of the water, as they each and all can be varied more or less without departing from the present invention; but if the fining compound is prepared as above stated, it will be found that the results are most satisfactory. It is advisable, however, not to increase the temperature of the water much above the degrees hereinbefore stated, as it thins the solution more than is desirable, and tends to lessen, if not destroy, its efficiency.

Having thus described my invention, what I claim, and desire to secure by Letters Patent, is—

The compound for fining malt liquors, consisting of a solution composed of water, argol, vinegar, isinglass, and salt, combined in about the proportions named.

HENRY JÜNEMANN.

Witnesses:
 GEO. H. EARL,
 EDWIN W. BROWN.